United States Patent
Abe et al.

(10) Patent No.: US 10,619,403 B2
(45) Date of Patent: Apr. 14, 2020

(54) GLASS PANEL UNIT

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Masataka Nonaka, Osaka (JP); Tasuku Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 16/089,880

(22) PCT Filed: Mar. 14, 2017

(86) PCT No.: PCT/JP2017/010144
§ 371 (c)(1),
(2) Date: Sep. 28, 2018

(87) PCT Pub. No.: WO2017/169731
PCT Pub. Date: Oct. 5, 2017

(65) Prior Publication Data
US 2019/0136608 A1    May 9, 2019

(30) Foreign Application Priority Data

Mar. 31, 2016 (JP) ................... 2016-072501

(51) Int. Cl.
*E06B 3/663* (2006.01)
*C03C 27/06* (2006.01)
(Continued)

(52) U.S. Cl.
CPC .......... *E06B 3/66304* (2013.01); *C03C 17/32* (2013.01); *C03C 27/06* (2013.01);
(Continued)

(58) Field of Classification Search
CPC .............. E06B 3/66304; E06B 3/6612; E06B 3/66342; E06B 3/67334; E06B 3/66333; Y02B 80/24; Y02A 30/25; C03C 27/06
See application file for complete search history.

(56) References Cited

U.S. PATENT DOCUMENTS 3,441,924 A * 4/1969 Peek .................. G08B 13/20
340/550
5,270,084 A    12/1993 Parker
(Continued)

FOREIGN PATENT DOCUMENTS

EP    2851351 A1    3/2015
JP    H11-100240 A    4/1999
(Continued)

OTHER PUBLICATIONS

International Search Report and Written Opinion issued in International Patent Application No. PCT/JP2017/010144, dated Jun. 20, 2017; with partial English translation.

*Primary Examiner* — Donald J Loney
(74) *Attorney, Agent, or Firm* — McDermott Will & Emery LLP

(57) ABSTRACT

A glass panel unit according to an example of the present disclosure includes a first glass panel and a second glass panel disposed to face the first glass panel. The glass panel unit includes: a seal having frame shape and hermetically binding the first glass panel and the second glass panel together; and a depressurized space surrounded by the first glass panel, the second glass panel, and the seal. The glass panel unit includes spacers between the first glass panel and the second glass panel. The spacers include a macromolecular resin material including molecular chains. Of the molecular chains, the number of molecular chains oriented in an orthogonal direction is larger than the number of molecular chains oriented in a counter direction. The orthogonal direc-
(Continued)

tion is a direction orthogonal to the counter direction, which is a direction in which the first and second glass panels face each other.

4 Claims, 13 Drawing Sheets

(51) Int. Cl.
    *E06B 3/66*     (2006.01)
    *C03C 17/32*     (2006.01)
    *E06B 3/673*     (2006.01)
    *E06B 3/677*     (2006.01)
(52) U.S. Cl.
    CPC ........ *E06B 3/6612* (2013.01); *E06B 3/66333* (2013.01); *E06B 3/66342* (2013.01); *E06B 3/6775* (2013.01); *E06B 3/67334* (2013.01); *Y02A 30/25* (2018.01); *Y02B 80/24* (2013.01)

(56) References Cited

U.S. PATENT DOCUMENTS

| | | | |
|---|---|---|---|
| 5,891,536 A * | 4/1999 | Collins | ............. B32B 17/10055 428/34 |
| 2003/0150177 A1 | 8/2003 | Baratuci et al. | |
| 2006/0101739 A1 | 5/2006 | Baratuci et al. | |
| 2017/0328122 A1 | 11/2017 | Abe et al. | |

FOREIGN PATENT DOCUMENTS

| | | |
|---|---|---|
| JP | H11-130475 A | 5/1999 |
| JP | H11-130476 A | 5/1999 |
| JP | H11-311069 A | 11/1999 |
| JP | 2004-513273 A | 4/2004 |
| WO | 2014/136152 A1 | 9/2014 |
| WO | 2016/084383 A1 | 6/2016 |

* cited by examiner

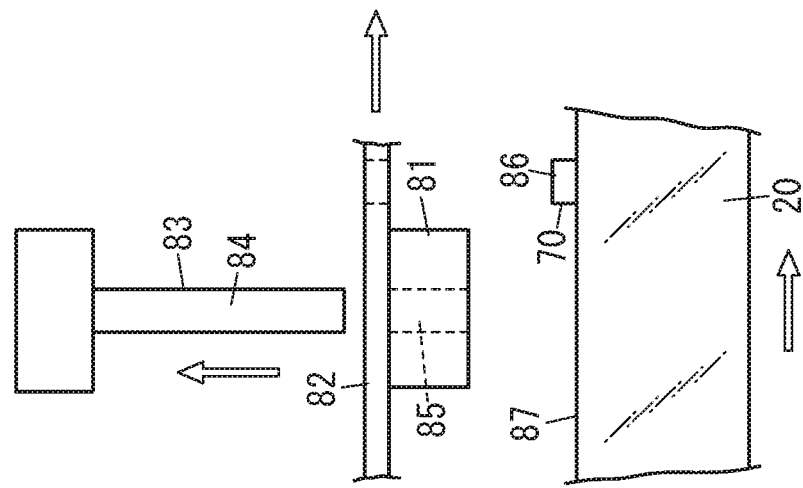
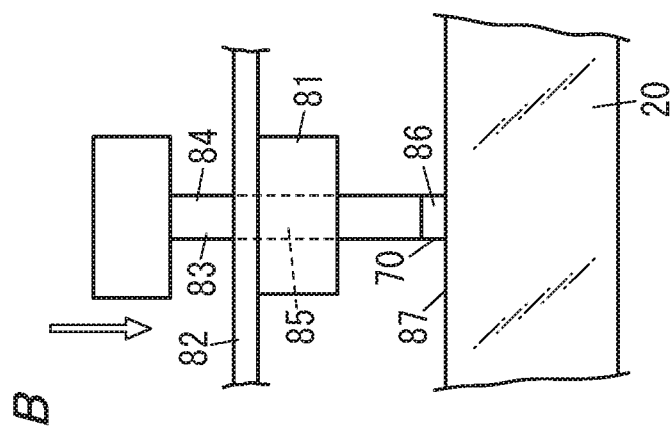
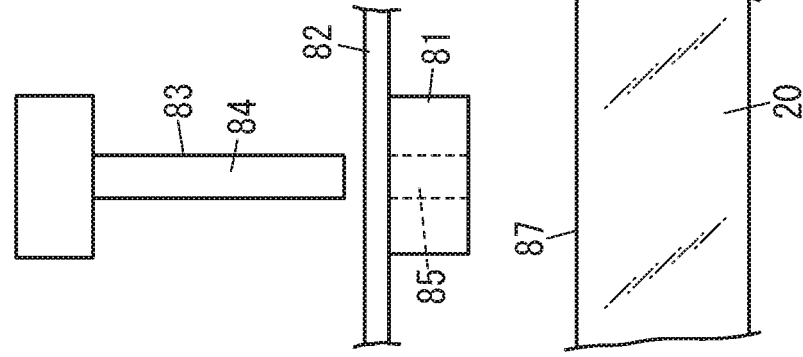

GLASS PANEL UNIT

CROSS-REFERENCE OF RELATED APPLICATIONS

This application is the U.S. National Phase under 35 U.S.C. § 371 of International Patent Application No. PCT/JP2017/010144, filed on Mar. 14, 2017, which in turn claims the benefit of Japanese Application No. 2016-072501, filed on Mar. 31, 2016, the entire disclosures of which Applications are incorporated by reference herein.

TECHNICAL FIELD

The present disclosure relates to a glass panel unit.

BACKGROUND ART

A glass panel unit including two or more glass panels stacked with a space therebetween to form a hermetically closed space and a vacuum created in the hermetically closed space is known (see, for example, Patent Literature 1). Such a glass panel unit is also referred to as an "insulated glazing". Such a glass panel unit is also referred to as a "vacuum insulated glass". The glass panel unit has high thermal insulation. In the glass panel unit, maintaining the vacuum is important.

It has been proposed that spacers be used to maintain a sufficient thickness for a vacuum space of such a glass panel unit. The spacers are parts interposed between the two glass panels.

In the glass panel unit, the spacers conduct heat between the two glass panels and thus influence the thermal insulation property of the glass panel unit. It is therefore desirable to reduce as much as possible the thermal conductivity of the spacers in a counter direction in which the two glass panels face each other.

CITATION LIST

Patent Literature

Patent Literature 1: JP H11-311069 A

SUMMARY

In view of the foregoing, it is an object of the present disclosure to provide a glass panel unit having reduced thermal conductivity in a counter direction in which glass panels face each other.

To solve the problems, a glass panel unit of one aspect according to the present disclosure includes a first glass panel including at least a glass pane and a second glass panel disposed to face the first glass panel. The second glass panel includes at least a glass pane. The glass panel unit includes a seal having a frame shape and hermetically binding the first glass panel and the second glass panel together, and a depressurized space surrounded by the first glass panel, the second glass panel, and the seal. The glass panel unit includes a spacer disposed between the first glass panel and the second glass panel. The spacer contains a macromolecular resin material including molecular chains. Of the molecular chains, a number of molecular chains oriented in an orthogonal direction is larger than a number of molecular chains oriented in a counter direction, the orthogonal direction being orthogonal to the counter direction, and the counter direction is a direction in which the first glass panel and the second glass panel face each other.

BRIEF DESCRIPTION OF DRAWINGS

FIG. 11A is a side view illustrating a setting step of a spacer provision step in the manufacturing process of the glass panel unit, FIG. 11B is a side view illustrating a spacer forming step of the spacer provision step in the manufacturing process of the glass panel unit, and FIG. 11C is a side view illustrating a displacement step of the spacer provision step in the manufacturing process of the glass panel unit;

DESCRIPTION OF EMBODIMENTS

The present disclosure relates to glass panel units and specifically, to a glass panel unit including a first glass panel and a second glass panel facing each other and a seal and spacers disposed between the first glass panel and the second glass panel.

A glass panel unit of a first embodiment will be described with reference to the drawings.

Figure 1:
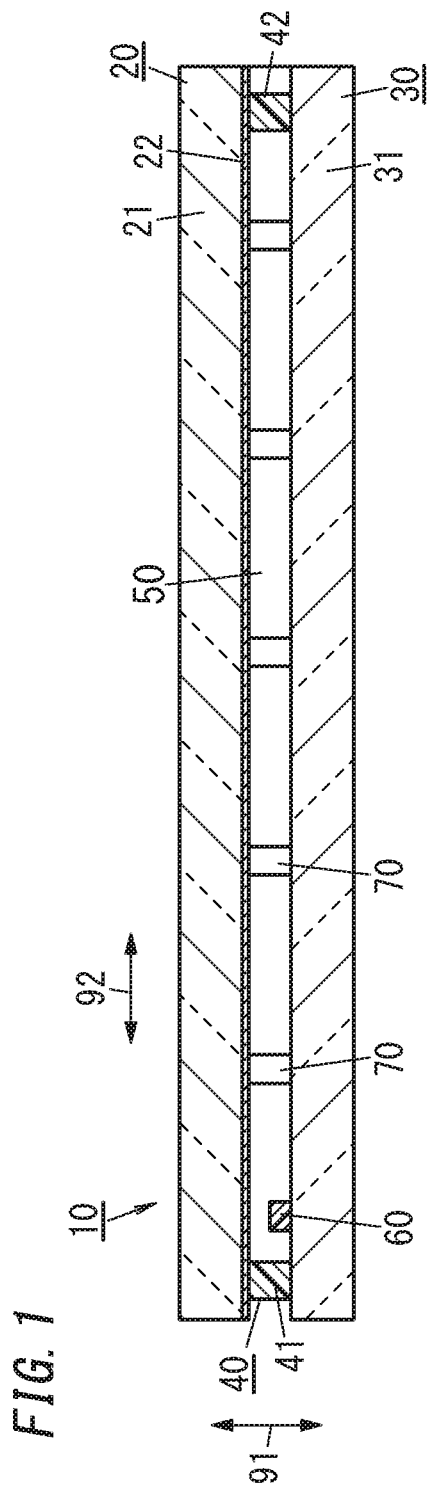
FIG. 1 is a sectional view schematically illustrating a glass panel unit according to a first embodiment of the present disclosure.
Figure 2:
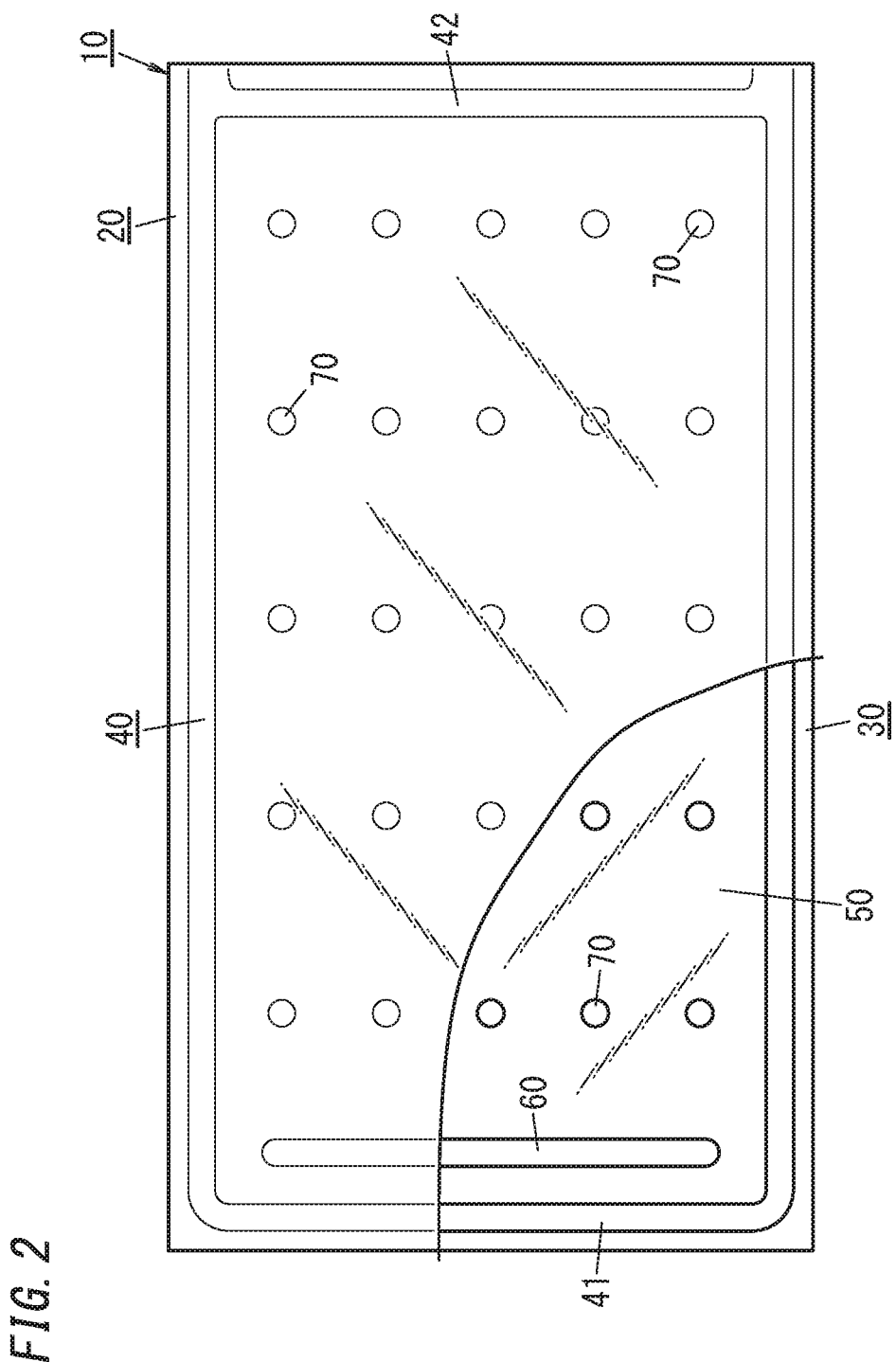
FIG. 2 is a plan view schematically illustrating the glass panel unit.

FIGS. 1 and 2 show a glass panel unit 10. The glass panel unit 10 of the first embodiment is a vacuum insulating glass unit. The vacuum insulating glass unit is a type of insulated glazing panels including at least a pair of glass panels and includes a depressurized space 50 between the pair of glass panels. Note that in FIG. 2, a part (lower left part) of a first glass panel 20 is cut away for ease of understanding of the internal structure of the glass panel unit.

The glass panel unit 10 includes the first glass panel 20, a second glass panel 30, a seal 40, a depressurized space 50, and spacers 70. The second glass panel 30 is disposed to face the first glass panel 20. The seal 40 has a frame shape and hermetically binds the first glass panel 20 and the second glass panel 30 together. The depressurized space 50 is surrounded by the first glass panel 20, the second glass panel 30, and the seal 40. The spacers 70 are disposed between the first glass panel 20 and the second glass panel 30. In the first embodiment, the spacers 70 contain polyimide having a benzoxazole structure. Note that the spacers 70 are not limited to spacers containing polyimide having a benzoxazole structure.

In the glass panel unit 10, the spacers 70 contain polyimide having a benzoxazole structure, and therefore, the strength of the spacers 70 is increased. Moreover, the spacers 70 contain the polyimide having the benzoxazole structure and are thus provided with elasticity. Moreover, the spacers 70 contain the polyimide having the benzoxazole structure and thus have increased heat resistance. Thus, the depressurized space 50 is sufficiently formed, and the glass panel unit 10 which is resistant to external impacts is obtained.

The first glass panel 20 includes a body 21 and a coating 22. The body 21 defines the planar shape of the first glass panel 20. The body 21 has a rectangular shape and includes a first surface (outer surface; an upper surface in FIG. 1) and a second surface (inner surface; a lower surface in FIG. 1) in a thickness direction thereof, and the first surface and the second surface are parallel to each other. Each of the first surface and the second surface of the body 21 is a flat surface. Examples of a material for the body 21 of the first glass panel 20 include soda-lime glass, high strain-point glass, chemically strengthened glass, no-alkali glass, quartz glass, Neoceram, and physically strengthened glass. Note that the first glass panel 20 does not have to include the coating 22.

The coating 22 is formed on the second surface of the body 21. The coating 22 is preferably an infrared reflective film. Note that the coating 22 is not limited to the infrared reflective film but may be a film having a desired physical property.

The second glass panel 30 includes a body 31 defining the planar shape of the second glass panel 30. The body 31 has a rectangular shape and includes a first surface (inner surface; an upper surface in FIG. 1) and a second surface (outer surface; a lower surface in FIG. 1) in a thickness direction thereof, and the first surface and the second surface are parallel to each other. Each of the first surface and the second surface of the body 31 is a flat surface. Examples of a material for the body 31 of the second glass panel 30 include soda-lime glass, high strain-point glass, chemically strengthened glass, no-alkali glass, quartz glass, Neoceram, and physically strengthened glass. The material for the body 31 may be the same as the material for the body 21.

The second glass panel 30 includes only the body 31. The second glass panel 30 may include a coating.

The first glass panel 20 and the second glass panel 30 are arranged such that the second surface of the body 21 and the first surface of the body 31 are parallel to each other and face each other.

The thickness of the first glass panel 20 is not particularly limited but is within a range of, for example, 1 mm to 10 mm. The thickness of the second glass panel 30 is not particularly limited but is within a range of, for example, 1 mm to 10 mm.

In FIGS. 1 and 2, the glass panel unit 10 further includes a gas adsorbent 60. The gas adsorbent 60 is disposed in the depressurized space 50. In the first embodiment, the gas adsorbent 60 has an elongated shape. The gas adsorbent 60 is disposed in any place in the depressurized space 50.

The gas adsorbent 60 is used to adsorb unnecessary gas (remaining gas and the like). The unnecessary gas is, for example, gas released when the seal 40 is formed.

The gas adsorbent 60 includes a getter. The getter is a material having a property of adsorbing molecules smaller than a prescribed size. The getter is, for example, an evaporable getter. Note that the evaporable getter mentioned herein refers to a type of getter which desorbs gas molecules adsorbed thereon to the outside when heated at a prescribed temperature or higher for activation. The evaporable getter is, for example, zeolite or ion-exchanged zeolite.

The seal 40 completely surrounds the depressurized space 50 and hermetically binds the first glass panel 20 and the second glass panel 30 together. The seal 40 is disposed between the first glass panel 20 and the second glass panel 30. The seal 40 has a rectangular frame shape. The depressurized space 50 has a degree of vacuum lower than or equal to a prescribed value. The prescribed value is, for example, 0.1 Pa, and when the internal pressure is lower than or equal to a pressure which can be regarded as being vacuum, the depressurized space 50 is a vacuum space.

The depressurized space 50 is created by being evacuated while heated. Heating increases the degree of vacuum. Moreover, the seal 40 is formed through heating.

The seal 40 is made of a thermal adhesive. The thermal adhesive is, for example, glass frit. The glass frit is, for example, low-melting-point glass frit. Examples of the low-melting-point glass frit include bismuth-based glass frit, lead-based glass frit, and vanadium-based glass frit.

The glass panel unit 10 includes a plurality of spacers 70. The plurality of spacers 70 are adopted to maintain a prescribed space between the first glass panel 20 and the second glass panel 30. The spacers 70 certainly secure the space between the first glass panel 20 and the second glass panel 30. The number of the spacers 70 may be one, but in order to secure a sufficient thickness between the glass panels, two or more spacers 70 are preferably provided. Adopting the plurality of spacers 70 increases the strength of the glass panel unit 10.

The plurality of spacers 70 are arranged in the depressurized space 50. Specifically, the plurality of spacers 70 are arranged at respective intersections of a virtual rectangular grid. For example, the plurality of spacers 70 are arranged at a pitch within a range of 1 cm to 10 cm. The pitch may specifically be 2 cm. Note that the sizes, number, pitch, and arrangement pattern of the spacers 70 may be appropriately selected.

Each of the spacers 70 has a shape of a column which has a height substantially equal to the prescribed space (space between the first glass panel 20 and the second glass panel 30). For example, the spacers 70 may have a diameter of 0.1 mm to 10 mm and a height of 10 μm to 1000 μm. Specifically, the spacers 70 have a diameter of 0.5 mm and a height of 100 μm. Note that each spacer 70 may have a desired shape such as a prism shape or a spherical shape. The height of the spacers 70 defines the distance between the first glass panel 20 and the second glass panel 30, that is, the thickness of the depressurized space 50. The thickness of the depressurized space 50 may be, for example, 10 μm to 1000 μm. The thickness of the depressurized space 50 is specifically 100 μm.

The spacers 70 are preferably made of a transparent material but do not have to be made of the transparent material. When the spacers 70 are made of the transparent material, the spacers 70 become less perceivable. Note that when being sufficiently small, each spacer 70 may be made of a non-transparent material. The material for the spacers 70 is selected so that the spacers 70 do not deform in a first melting step, an evacuation step, and a second melting step which will be described later.

The spacers 70 contain polyimide having a benzoxazole structure. The polyimide is a polymer having a structure defined by the following general formula (1).

[Chemical Formula 1]

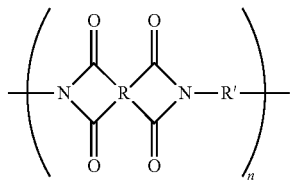

(1)

In the formula (1), R and R' independently denote an organic group, and n denotes an integer larger than or equal to 1.

The benzoxazole structure is introduced into the structure defined by the general formula (1). The benzoxazole structure is preferably introduced into the organic group R' in the general formula (1). Benzoxazole is defined by formula (2). Hydrogen in the benzoxazole defined by the formula (2) is substituted with another element in polyimide, and thereby, the benzoxazole structure is introduced into the polyimide. Preferably, two or more hydrogen atoms are substituted, thereby introducing the benzoxazole structure into a main chain of the polymer.

[Chemical Formula 2]

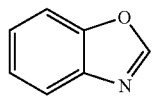

(2)

The polyimide having the benzoxazole structure may have a phenyl benzoxazole structure. Phenyl benzoxazole is defined by formula (3). Hydrogen in the phenyl benzoxazole defined by the formula (3) is substituted by another element in the polyimide, thereby introducing the phenyl benzoxazole structure into the polyimide. Preferably, two or more hydrogen atoms are substituted, thereby introducing the phenyl benzoxazole structure into the main chain of the polymer.

[Chemical Formula 3]

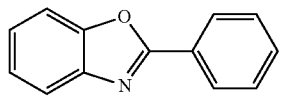

(3)

The polyimide having the benzoxazole structure may have a phenylene bisbenzoxazole structure. Phenylene bisbenzoxazole is defined by formula (4). Hydrogen in the phenylene bisbenzoxazole defined by the formula (4) is substituted with another element in the polyimide, thereby introducing the phenylene bisbenzoxazole structure into the polyimide. Preferably, two or more hydrogen atoms are substituted, thereby introducing the phenylene bisbenzoxazole structure into the main chain of the polymer.

[Chemical Formula 4]

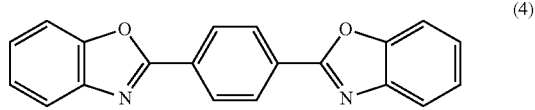

(4)

The polyimide having the benzoxazole structure may include a diphenyl benzobisoxazole structure. Diphenyl benzobisoxazole is defined by formula (5). Hydrogen in the diphenyl benzobisoxazole defined by the formula (5) is substituted with another element in the polyimide, thereby introducing the diphenyl benzobisoxazole structure into the polyimide. Preferably, two or more hydrogen atoms are substituted, thereby introducing the diphenyl benzobisoxazole structure into the main chain of the polymer.

[Chemical Formula 5]

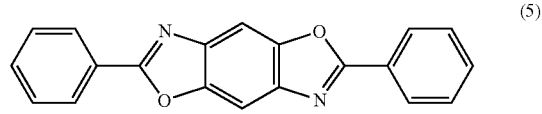

(5)

The polyimide is obtained through polycondensation of diamines and tetracarboxylic anhydrides. The diamines are preferably aromatic diamines. The tetracarboxylic anhydrides are preferably aromatic tetracarboxylic anhydrides. Polyimide obtained by reaction of the aromatic diamines and the aromatic tetracarboxylic anhydrides with each other is preferably adopted. The aromatic diamines preferably have benzoxazole structures. Adopting the aromatic diamines having the benzoxazole structures enables the benzoxazole structures to be introduced into the polyimide.

Examples of the aromatic diamines having the benzoxazole structures include a substance defined by any of the following formula (6), formula (7), and formula (8).

[Chemical Formula 6]

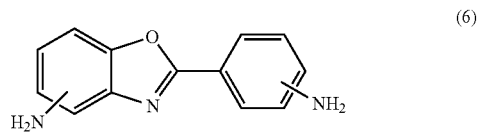

(6)

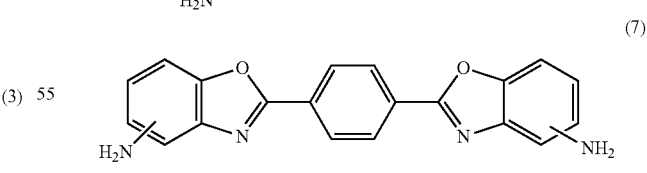

(7)

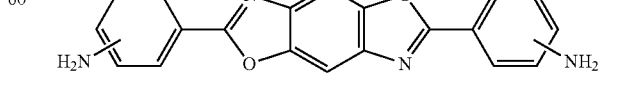

(8)

Examples of the aromatic diamines having the benzoxazole structures specifically include 5-amino-2-(p-aminophenyl)benzoxazole, 6-amino-2-(p-aminophenyl)benzoxazole, 5-amino-2-(m-aminophenyl)benzoxazole, 6-amino-2-(m-aminophenyl)benzoxazole, 2,2-p-phenylene bis(5-aminobenzoxazole), 1,5-(5-aminobenzoxazolo)-4-(5-aminobenzoxazolo)benzene, 2,6-(4,4'-diaminodiphenyl)benzo[1,2-d:5,4-]bisoxazole, 2,6-(4,4'-diaminodiphenyl)benzo[1,2-d:4,5-d']bisoxazole, 2,6-(3,4'-diaminodiphenyl)benzo[1,2-d:5,4-]bisoxazole, 2,6-(3,4'-diaminodiphenyl)benzo[1,2-d:4,5-d']bisoxazole, 2,6-(3,3'-diaminodiphenyl)benzo[1,2-d:5,4-]bisoxazole, and 2,6-(3,3'-diaminodiphenyl)benzo[1,2-d:4,5-d']bisoxazole.

One of these aromatic diamines may be adopted alone, or two or more of these aromatic diamines may be adopted together.

Examples of the aromatic tetracarboxylic anhydrides include pyromellitic dianhydride, 3,3',4,4'-biphenyl tetracarboxylic anhydride, 4,4'-oxydiphthalic anhydride, 3,3',4,4'-benzophenone tetracarboxylic anhydride, 3,3',4,4'-diphenyl sulfone tetracarboxylic anhydride, and 2,2-bis[4-(3,4-dicarboxyphenoxy)phenyl]propanoic anhydride.

One of these aromatic tetracarboxylic anhydrides may be adopted alone, or two or more of these aromatic tetracarboxylic anhydrides may be adopted together.

In the known art, metal has been widely used as the spacers of the glass panel unit (see, for example, Patent Literature 1, [0017]). However, metal generally has too high thermal conductivity to achieve thermal insulation advantageously. A resin with high strength could be adopted as a material for the spacers, but the resin with high strength has generally high density and thus has high thermal conductivity and insufficient thermal insulation. Moreover, metal has low elasticity and hardly absorb impacts, and therefore, the glass panel unit becomes vulnerable to impact. Moreover, glass or ceramic could be used as a material for the spacers (see Patent Literature 1, [0026] <4>). In this case, however, the strength would tend to decrease. As described above, in the case of an ordinary material (material having no anisotropy of the thermal conductivity), it is difficult to realize high strength and low thermal conductivity (in other words, both the thermal insulation property and the impact resistance).

Note that a thermal conductivity required for the spacers 70 is that the thermal conductivity (unit: W/(m·K)) is low in a counter direction 91 in which the first glass panel 20 and the second glass panel 30 face each other.

Moreover, the strength required for the spacers 70 is mainly compressive strength. When the spacers 70 are compressed in the counter direction 91, the spacers 70 deforms to reduce the dimension thereof in the counter direction 91, and simultaneously, the dimension of the spacers 70 in orthogonal directions 92 orthogonal to the counter direction 91 increases.

In general, heat is easily transferred in a direction in which chemical binding of molecules forms molecular chains, and the heat is hardly transferred between molecular chains. Moreover, when curved molecular chains are straightened, a macromolecular material deforms. Therefore, when directions of the molecular chains are not fixed, the macromolecular material easily deforms. The spacers 70 are continuously compressed by atmospheric pressure. Therefore, when directions of molecular chains 71 (see FIGS. 3A to 3C) are not fixed, creep deformation is more likely caused by long-term use, and thus, morphological stability is degraded. Moreover, when the macromolecular material is subjected to a heavy load and deforms, the molecular chains 71 which are tangled may be broken if the directions of the molecular chains 71 are not fixed. Thus, also from the point of view of the strength and morphological stability, it is preferable that in the spacers 70, the directions of the molecular chains 71 correspond to the orthogonal direction 92.

Thus, when the directions of the molecular chains 71 of the spacer 70 are set to correspond to the orthogonal direction 92, it is possible to realize high strength and a low thermal conductivity (in other words, both thermal insulation property and impact resistance).

In the first embodiment, as illustrated in FIG. 1, the spacers 70 are made of a material whose thermal conductivity in the counter direction 91 of the first glass panel 20 and the second glass panel 30 is lower than the thermal conductivity in the orthogonal direction 92 with respect to the counter direction 91.

With this configuration, adopting a special material having anisotropy of the thermal conductivity reduces the thermal conductivity in the counter direction 91 of the first glass panel 20 and the second glass panel 30 as much as possible while easily securing the impact resistance.

In particular, in the first embodiment, the spacers 70 include a macromolecular resin material including the molecular chains 71. The molecular chains 71 have an orientation in which an elongation direction 73 (see FIG. 3C) corresponds to the orthogonal direction 92.

With this configuration, a resin material having anisotropy of the thermal conductivity is adopted to reduce only the thermal conductivity in the counter direction 91 of the first glass panel 20 and the second glass panel 30, and thus, the impact resistance is easily secured. In the first embodiment, the polyimide provides the spacers 70 with high strength. The spacers 70 have elasticity and improve the impact resistance of the glass panel unit 10. The spacers 70 are heat-resistant and less likely to be destroyed. The spacers 70 have low thermal conductivity and improve a thermal insulation property.

Figure 3A:
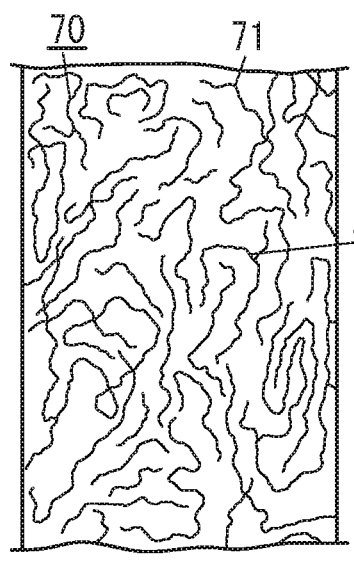
FIG. 3A is an enlarged view illustrating an example of an internal composition of a resin material included in a spacer in the glass panel unit.

FIG. 3A shows an enlarged view of an example of an internal composition of a resin material included in the spacers 70. In the resin material illustrated in FIG. 3A, the molecular chains 71 have no directional property (orientation) and thus have no anisotropy of the thermal conductivity. Moreover, the resin material included in the spacers 70 includes no crystal part. The resin material shown in FIG. 3A is not suitable as a resin material included in the spacers 70.

Figure 3B:
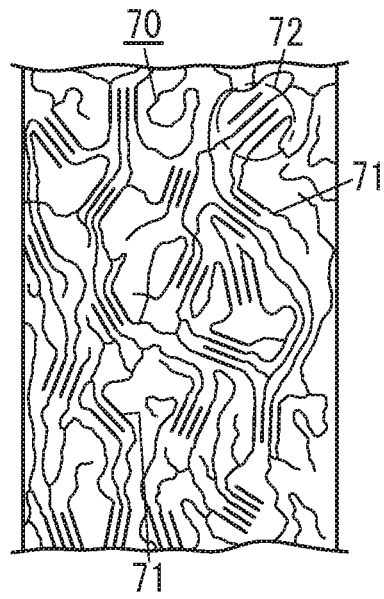
FIG. 3B is an enlarged view illustrating another example of the internal composition of the resin material included in the spacer in the glass panel unit.

FIG. 3B shows an enlarged view of another example of the internal composition of the resin material included in the spacers 70. In the resin material shown in FIG. 3B, the molecular chains 71 have no directional property (orientation) and thus have no anisotropy of the thermal conductivity. However, the resin material included in the spacers 70 includes a crystal part (microcrystals, that is, crystallites 72). In the crystallites 72, the molecular chains 71 are bound together with strong binding force. Thus, when compared with the spacers 70 including the resin material shown in FIG. 3A, the spacers 70 including the resin material shown in FIG. 3B has a high strength and high impact resistance. The resin material shown in FIG. 3B is also not suitable as a resin material included in the spacers 70.

Figure 3C:
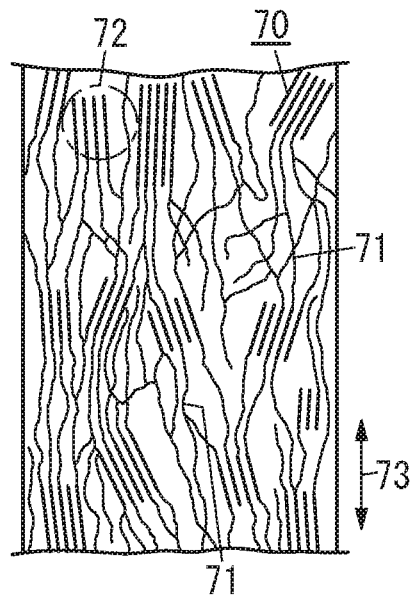
FIG. 3C is an enlarged view illustrating still another example of the internal composition of the resin material included in the spacer in the glass panel unit.

FIG. 3C shows an enlarged view of still another example of the internal composition of the resin material included in the spacers 70. In the resin material shown in FIG. 3C, the molecular chains 71 have a directional property (orientation) and thus have anisotropy of the thermal conductivity. When in the resin material shown in FIG. 3C, the direction in which the molecular chains 71 are oriented is defined as the elongation direction 73, the spacers 70 including the resin material shown in FIG. 3C are arranged such that the elongation direction 73 is oriented in the orthogonal direction 92.

The elongation direction 73 is adjusted such that when the resin material is elongated to be in a seat-like shape, the molecular chains 71 are oriented in the elongation direction of the seat.

Moreover, the resin material shown in FIG. 3C has crystallites 72, and the spacers 70 including the resin material shown in FIG. 3C have high strength and high resistance. The resin material shown in FIG. 3C is suitable as the resin material for forming the spacers 70.

A method for providing the spacers 70 with the orientation of the molecular chains 71 may be but is not particularly limited to a method of elongating a macromolecular film in the orthogonal direction 92, a method of forming the spacers 70 by so-called spin-coating, a method of rolling a macromolecular film, a method of pressing the macromolecular film, or the like.

The spacers 70 are preferably made of polyimide whose viscoelastic coefficient at 400° C. is higher than 500 MPa. Thus, the glass panel unit 10 with high strength is obtained. The viscoelastic coefficient of the polyimide at 400° C. may be lower than $1 \times 10^6$ MPa. The viscoelastic coefficient of the polyimide at 400° C. is preferably higher than 1000 MPa, more preferably higher than 1500 MPa, and much more preferably higher than 2000 MPa. The viscoelastic coefficient is measured by a viscoelastic measuring device. Examples of the viscoelastic measuring device include a dynamic mechanical analysis (DMA) device and a thermomechanical analysis (TMA) device. In polyimide contained in the spacers 70, the ratio of a viscoelastic coefficient V400 at 400° C. to a viscoelastic coefficient V20 at 20° C. (V400/V20) is preferably higher than or equal to 0.1. This ratio (V400/V20) is more preferably higher than or equal to 0.2, much more preferably higher than or equal to 0.3, and much more preferably higher than or equal to 0.4. The spacers 70 are preferably made of polyimide whose thermal expansion coefficient at 400° C. is lower than 10 ppm/° C. Thus, the glass panel unit 10 with high strength is obtained. The thermal expansion coefficient of the polyimide at 400° C. may be higher than 0.1 ppm/° C. The thermal expansion coefficient is measured with a thermal expansion coefficient measuring device. Examples of the thermal expansion measuring device include a thermomechanical analysis (TMA) device. The spacers 70 are more preferably made of polyimide whose viscoelastic coefficient at 400° C. is higher than 500 MPa and whose thermal expansion coefficient at 400° C. is lower than 10 ppm/° C.

In this embodiment, the spacers 70 are preferably formed of at least one layer of polyimide film. Using the polyimide film facilitates formation of the spacers 70. The polyimide film is cut in the shape of the spacers 70 and used as the spacers 70.

In this embodiment, a method of elongating the macromolecular film in orthogonal directions 92 to provide the spacer 70 with the orientation of the molecular chains 71 will be described.

The macromolecular film may be elongated only in a first direction (one of the orthogonal directions 92) in the plane thereof. Alternatively, the macromolecular film may be elongated in both the first direction and a second direction orthogonal to the first direction (the other direction of the orthogonal directions 92) in the plane thereof. As the macromolecular film, a polyimide film is preferably used, but the macromolecular film is not particularly limited to this example.

Thus, when a method of elongating a macromolecular film is adopted, an elongation ratio or a percentage elongation of the macromolecular film, that is, a ratio of the length of the macromolecular film after elongation to the length of the macromolecular film before elongation is preferably high as long as the macromolecular film is not broken.

The elongation ratio in the first direction and the elongation ratio in the second direction are independent of each other. Thus, when the macromolecular film is elongated in both the first direction and the second direction, the elongation ratio in the first direction and the elongation ratio in the second direction may be different from each other. When the elongation ratio in the first direction and the elongation ratio in the second direction are different from each other, the highest possible elongation ratio can be achieved, and it is possible to further increase the compressive strength and to further reduce the thermal conductivity in the counter direction 91.

Specifically, for example, the elongation ratio in the first direction may be 1, and the elongation ratio in the second direction may be 2, 5, 10, or a value higher than 10. Alternatively, for example, the elongation ratio in the first direction may be 2, and the elongation ratio in the second direction may be 10. When the elongation ratio in the first direction is 2, and the elongation ratio in the second direction is 10, the strength at a high temperature is higher than when the elongation ratio in the first direction is 4, and the elongation ratio in the second direction is 4.

Note that a method for providing the spacers 70 with the orientation of the molecular chains 71 other than a method of elongating the macromolecular film in the orthogonal direction 92 will further be described later.

The area ratio of the spacers 70 with respect to the glass panel unit 10 in plan view is preferably within a range of 0.01% to 0.2%. Thus, it is possible to make the spacers 70 less perceptible and to increase the strength of the glass panel unit 10. As used herein "in plan view" means viewing in a thickness direction of the glass panel unit 10. The thickness direction of the glass panel unit 10 is equal to a height direction of the spacers 70.

With reference to FIGS. 4 to 10, a manufacturing method of the glass panel unit 10 will be described. FIGS. 4 to 10 show an exemplary manufacturing process of the glass panel unit 10. The glass panel unit 10 shown in FIGS. 1 to 3 may be manufactured by the method shown in FIGS. 4 to 10. In the method illustrated in FIGS. 4 to 10, a glass panel unit 10 without an exhaust port is manufactured.

Figure 4:
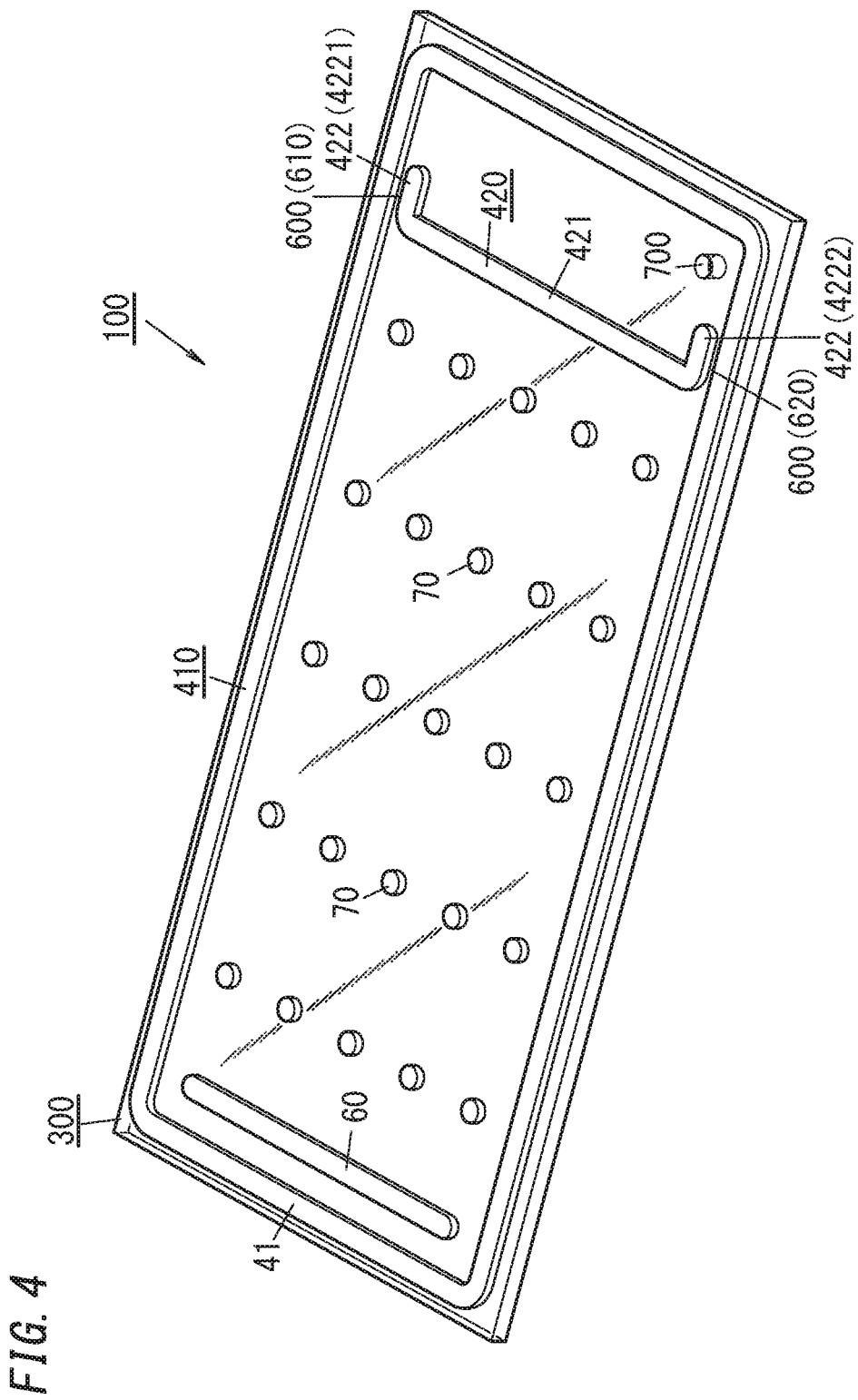
FIG. 4 is a perspective view illustrating a manufacturing process of the glass panel unit.
Figure 5:
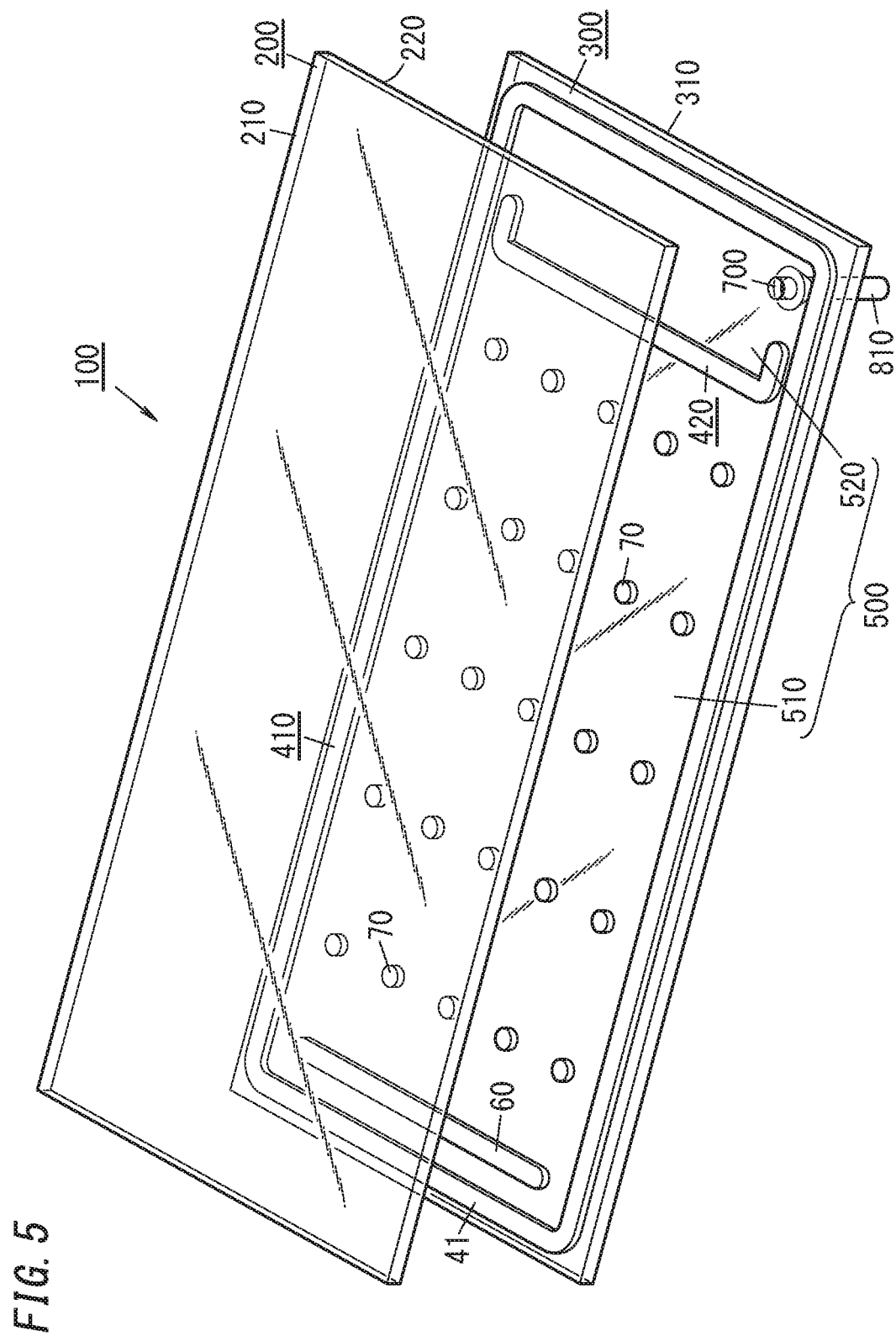
FIG. 5 is a perspective view illustrating the manufacturing process of the glass panel unit.
Figure 6:
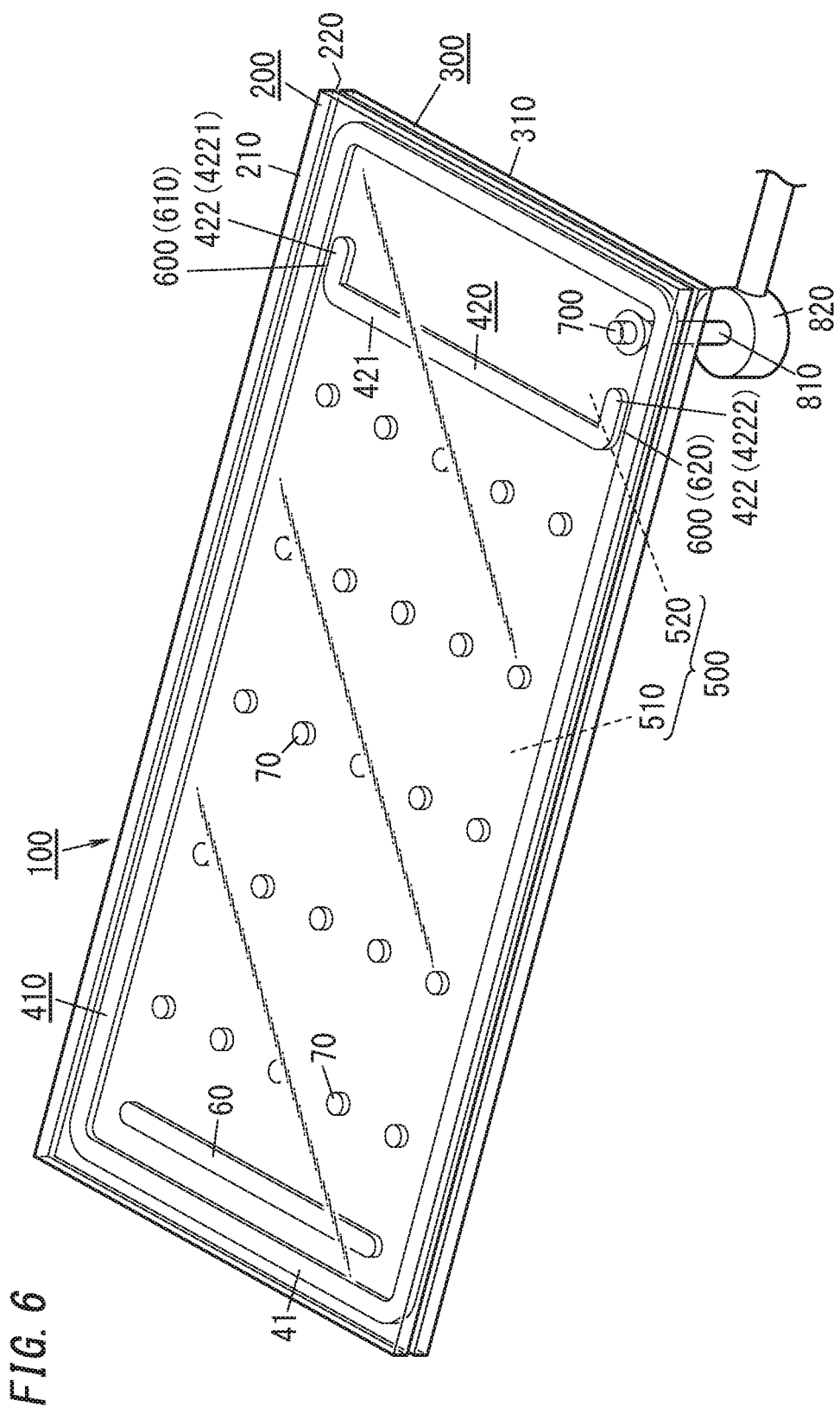
FIG. 6 is a perspective view illustrating the manufacturing process of the glass panel unit.
Figure 7:
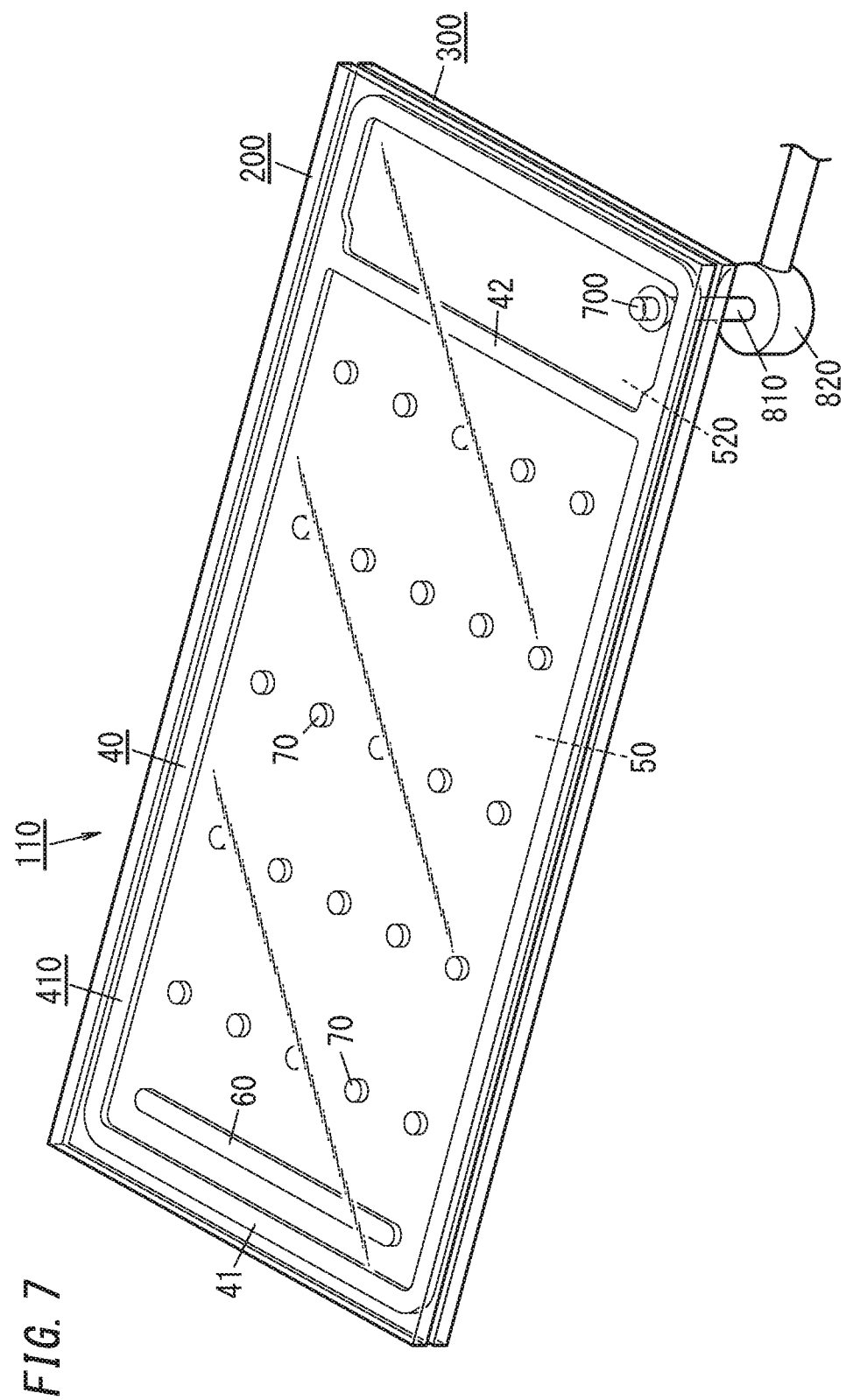
FIG. 7 is a perspective view illustrating the manufacturing process of the glass panel unit.
Figure 8:
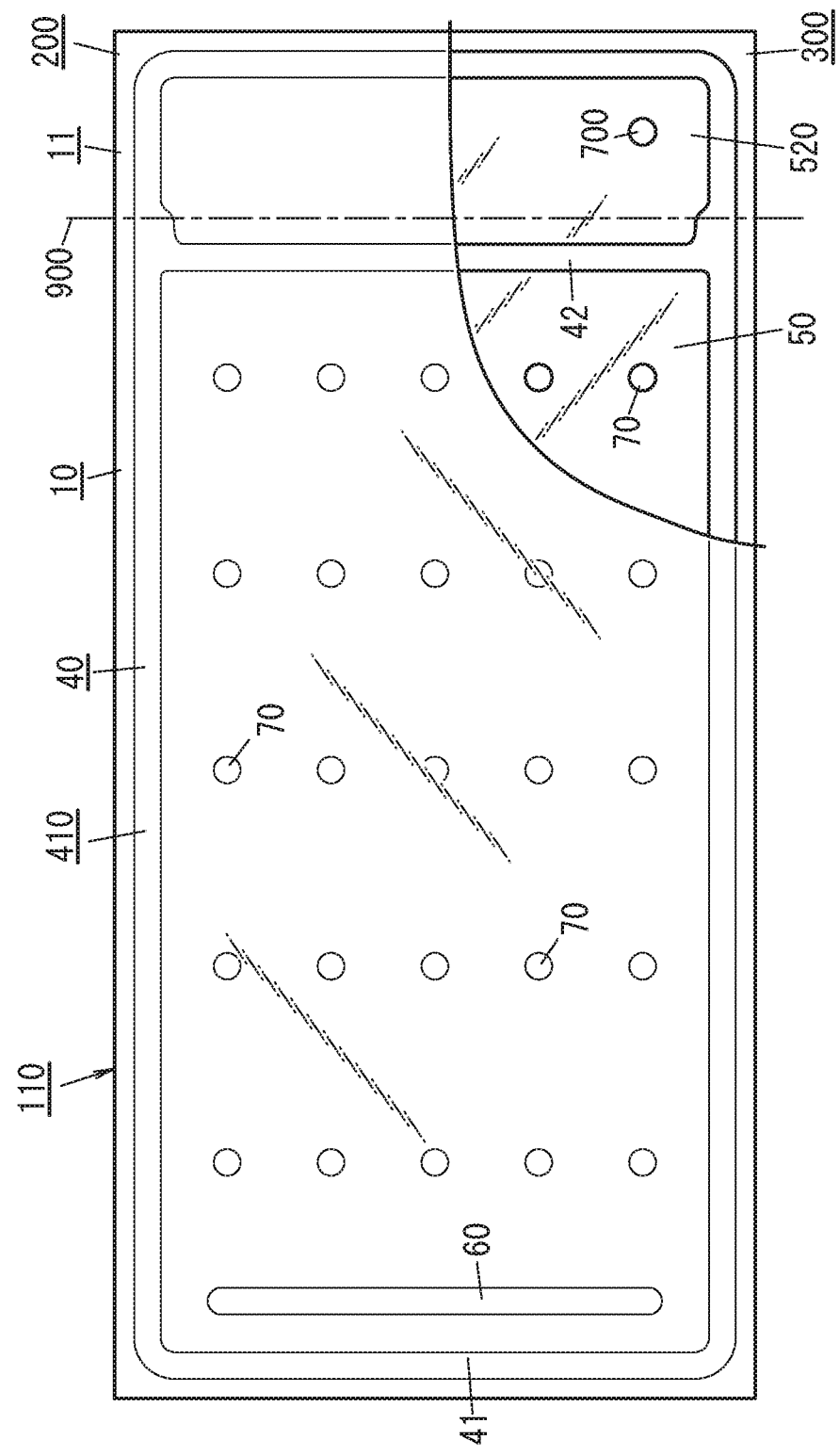
FIG. 8 is a plan view schematically illustrating an assembly for the glass panel unit.
Figure 9:
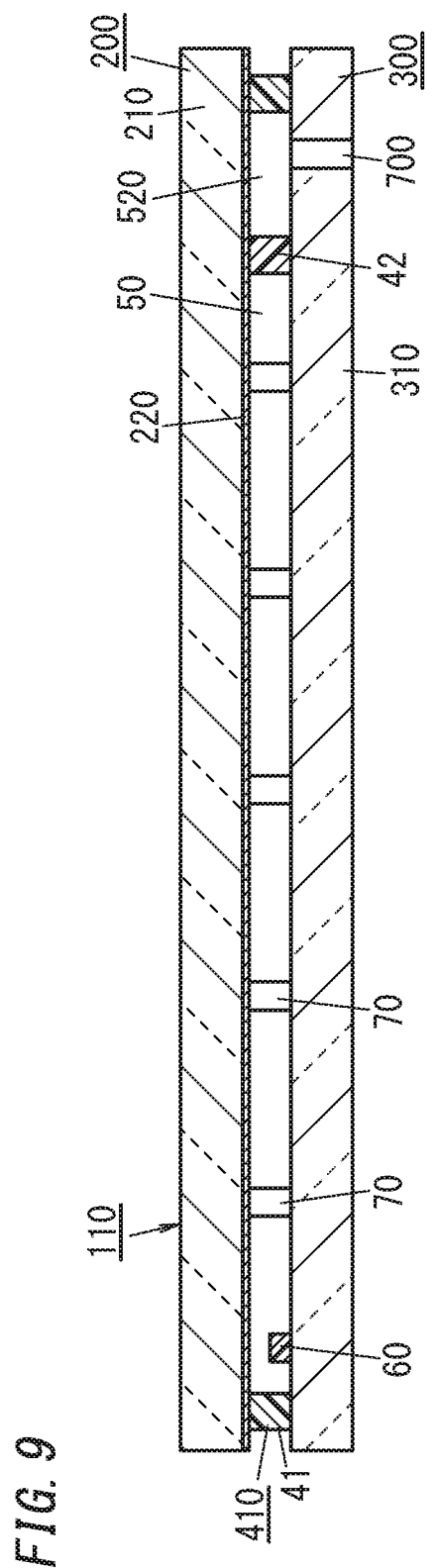
FIG. 9 is a sectional view schematically illustrating the assembly for the glass panel unit.
Figure 10:
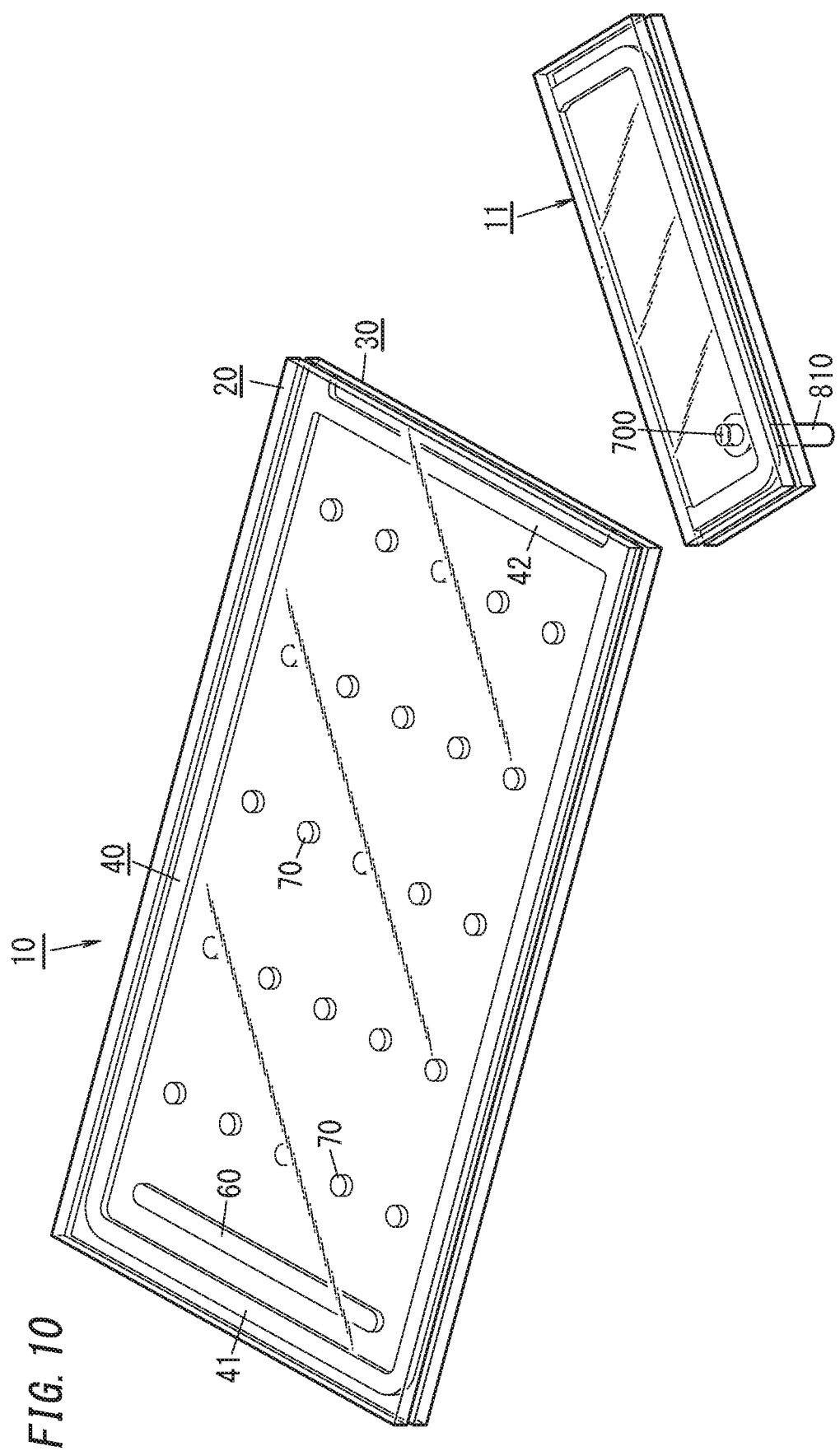
FIG. 10 is a perspective view illustrating the manufacturing process of the glass panel unit.

For the glass panel unit 10, a pre-assembled component 100 as illustrated in FIGS. 4 to 6 is obtained, and then, predetermined processes are preformed to obtain an assembly 110 as illustrated in FIGS. 7 to 9. Thereafter, as illustrated in FIG. 10, a portion is cut off from the assembly 110 to obtain the glass panel unit 10.

The manufacturing method of the glass panel unit 10 includes a preparation step, an assembling step, a hermetically sealing step, and a removal step. Note that the preparation step may be omitted.

The preparation step is a step of preparing a first plate glass 200, a second plate glass 300, a frame member 410, a partition 420, the gas adsorbent 60, and the plurality of spacers 70. In the preparation step, an inside space 500, an air passage 600, and an exhaust port 700 may be formed.

The first plate glass 200 is a plate glass used for the first glass panel 20. As illustrated in FIG. 9, the first plate glass 200 includes a glass pane 210 and a coating 220. Note that the coating 220 may be omitted.

The second plate glass 300 is a plate glass used for the second glass panel 30. As illustrated in FIG. 9, the second plate glass 300 includes a glass pane 310 defining the planar shape of the second plate glass 300. The glass pane 310 is the second plate glass 300 itself.

The second plate glass 300 is disposed to face the first plate glass 200.

The frame member 410 is disposed between the first plate glass 200 and the second plate glass 300 and hermetically binds the first plate glass 200 and the second plate glass 300 together. Thus, as illustrated in FIG. 6, the inside space 500 surrounded by the frame member 410, the first plate glass 200, and the second plate glass 300 is formed.

The frame member 410 is formed of a thermal adhesive (first thermal adhesive having a first softening point). The first thermal adhesive is, for example, glass frit. The glass frit is, for example, low-melting-point glass frit. Examples of the low-melting-point glass frit include bismuth-based glass frit, lead-based glass frit, and vanadium-based glass frit.

The partition 420 is disposed in the inside space 500. As illustrated in FIG. 6, the partition 420 divides the inside space 500 into an evacuation space 510 and a vent space 520. The evacuation space 510 is a space which will be evacuated later, and the vent space 520 is a space used for the evacuation of the evacuation space 510.

The partition 420 includes a wall section 421 and a pair of blocking sections 422 (a first blocking section 4221 and a second blocking section 4222). The wall section 421 is formed along the width direction of the second plate glass 300. The width direction means a direction along short sides of the pre-assembled component 100 having a rectangular shape in FIG. 6. Note that both ends in a length direction of the wall section 421 are not in contact with the frame member 410. The pair of blocking sections 422 extends from both of the ends in the length direction of the wall section 421 to a first end in a length direction of the second plate glass 300.

The partition 420 is formed of a thermal adhesive (second thermal adhesive having a second softening point). The second thermal adhesive is, for example, glass frit. The glass frit is, for example, low-melting-point glass frit. Examples of the low-melting-point glass frit include bismuth-based glass frit, lead-based glass frit, and vanadium-based glass frit.

As illustrated in FIG. 4, the plurality of spacers 70 may be arranged at prescribed intervals in rows and columns.

Here, the height of the spacers 70 as a member before assembled into the glass panel unit 10 may be different from the height of the spacers 70 after the glass panel unit 10 is formed. The spacers 70 may be compressed in the height direction by being sandwiched between two glass panels. When the spacers 70 contain polyimide having a benzoxazole structure, the strength of the spacers 70 is increased, and therefore, it is possible to suppress the spacers 70 from being too strongly compressed. Thus, the thickness of the depressurized space 50 is easily secured. Moreover, the strength of the glass panel unit 10 can be increased. Moreover, the spacers 70 are suppressed from being destroyed, and the appearance (aesthetic property) of the glass panel unit 10 can be improved.

The air passage 600 is in communication with the evacuation space 510 and the vent space 520 in the inside space 500. The air passage 600 includes a first air passage 610 and a second air passage 620. The first air passage 610 is a space formed between the first blocking section 4221 and a part of the frame member 410 facing the first blocking section 4221.

The second air passage 620 is a space formed between the second blocking section 4222 and a part of the frame member 410 facing the second blocking section 4222.

The exhaust port 700 is a pore communicating with the vent space 520 and the outside space. The exhaust port 700 is used to evacuate the evacuation space 510 through the vent space 520 and the air passage 600.

The members as described above are subjected to the preparation step. The preparation step includes a first to sixth steps. Note that the order of the second to sixth steps may accordingly be changed.

The first step is a step (plate glass forming step) of forming the first plate glass 200 and the second plate glass 300.

The second step is a step of forming the exhaust port 700. In the second step, the exhaust port 700 is formed in the second plate glass 300. Note that the exhaust port 700 may be formed in the first plate glass 200.

The third step is a step (seal member forming step) of forming the frame member 410 and the partition 420. In the third step, a material (the first thermal adhesive) for the frame member 410 and a material (the second thermal adhesive) for the partition 420 are applied to the second plate glass 300 (a first surface of the glass pane 310) with a dispenser or the like. Then, the material for the frame member 410 and the material for the partition 420 are dried and pre-sintered.

The fourth step is a step (spacer provision step) of providing the spacers 70. In FIGS. 11A to 11C, an example of the spacer provision step is shown. The spacer provision step includes a setting step, a spacer forming step, and a displacement step sequentially.

In the setting step shown in FIG. 11A, the first glass panel 20, a punching die 81, a sheet material 82, and a punch section 83 are set in this order from bottom to top. The sheet material 82 covers an upper surface of the punching die 81. A punch 84 included in the punch section 83 is located directly above a through hole 85 in the punching die 81 with the sheet material 82 provided between the punch 84 and the punching die 81.

In the spacer forming step shown in FIG. 11B, the punch section 83 is driven downward along a linear track. The punch section 83 is driven downward, thereby punching out a part 86 of the sheet material 82 downward by the punch 84 having a columnar shape through the through hole 85 in the punching die 81 (see the void arrow in FIG. 11B).

The part 86 of the sheet material 82 punched by the punch 84 is pressed onto one surface 87 of the first glass panel 20 with the part 86 abutting a tip surface of the punch 84.

The part 86 of the sheet material 82 is pressed onto the one surface 87 of the first glass panel 20 at a prescribed pressure for a predetermined time by the tip surface of the punch 84, thereby being prefixed to the one surface 87. The part 86 of the sheet material 82 thus prefixed is included in the spacer 70 on the one surface 87.

In the displacement step shown in FIG. 11C, as illustrated in the void arrows, after the punch section 83 moves upward, the first glass panel 20 and the sheet material 82 move in the horizontal direction. In the first embodiment, the travel direction of the first glass panel 20 and the travel direction of the sheet material 82 are the same, but the travel direction of the first glass panel 20 and the travel direction of the sheet material 82 may be different from each other.

The fourth step is as described above. Note that the fourth step is not limited to the step described above.

The fifth step is a step (gas adsorbent forming step) of forming the gas adsorbent 60. In the fifth step, a solution in which powder of a getter is dispersed is applied at a predetermined location on the second plate glass 300 and is dried, thereby forming the gas adsorbent 60.

After the first step through the fifth step are completed, the second plate glass 300 provided with the frame member 410, the partition 420, the air passage 600, the exhaust port 700, the gas adsorbent 60, and the plurality of spacers 70 as illustrated in FIG. 4 is obtained.

The sixth step is a step (disposition step) of disposing the first plate glass 200 and the second plate glass 300 (see FIG. 5). In the sixth step, the first plate glass 200 and the second plate glass 300 are disposed such that the second surface of the glass pane 210 and the first surface of the glass pane 310 are parallel to each other and face each other.

The assembling step is a step of preparing the pre-assembled component 100. Specifically, the assembling step is a step (first melting step) of hermetically binding the first plate glass 200 and the second plate glass 300 together by the frame member 410.

Specifically, the assembling step is a step (first melting step) of hermetically binding the first plate glass 200 and the second plate glass 300 together by the frame member 41.

In the first melting step, the first thermal adhesive is once melted at a predetermined temperature (first melting temperature) higher than or equal to the first softening point to hermetically bind the first plate glass 200 and the second plate glass 300 together. The first plate glass 200 and the second plate glass 300 are hermetically bound together by the frame member 410.

Through the assembling step (first melting step), the pre-assembled component 100 shown in FIG. 6 is obtained. The pre-assembled component 100 includes the first plate glass 200, the second plate glass 300, the frame member 410, the inside space 500, the partition 420, the air passage 600, the exhaust port 700, the gas adsorbent 60, and the plurality of spacers 70.

The hermetically sealing step is a step of performing the predetermined processes on the pre-assembled component 100 to obtain the assembly 110. The hermetically sealing step includes an evacuation step and a melting step (second melting step). That is, the evacuation step and the second melting step correspond to the predetermined processes.

The evacuation step is a step of evacuating the evacuation space 510 at a predetermined temperature (evacuation temperature) through the air passage 600, the vent space 520, and the exhaust port 700 to create the depressurized space 50.

The evacuation is performed with, for example, a vacuum pump. As illustrated in FIG. 6, the vacuum pump is connected to the pre-assembled component 100 via an exhaust pipe 810 and a seal head 820. The exhaust pipe 810 is bound to the second plate glass 300, for example, such that the interior of the exhaust pipe 810 is in communication with the exhaust port 700.

The first melting step, the evacuation step, and the second melting step are performed with the first plate glass 200 and the second plate glass 300 being placed in a melting furnace.

The second melting step is a step of deforming the partition 420 to form a partition 42 closing the air passage 600 to form the seal 40 surrounding the depressurized space 50. In the second melting step, the second thermal adhesive is once melted at a predetermined temperature (second melting temperature) higher than or equal to the second softening point to deform the partition 420, thereby forming the partition 42.

When the partition 42 is formed, the depressurized space 50 is separated from the vent space 520. Thus, the depressurized space 50 can no longer be evacuated by the vacuum pump. Until the second melting step is completed, the frame member 410 and the partition 42 are heated, and therefore, gas may be released from the frame member 410 and the partition 42. However, the gas released from the frame member 410 and the partition 42 is adsorbed by the gas adsorbent 60 in the depressurized space 50. This prevents degradation of the degree of depressurization (degree of vacuum) in the depressurized space 50.

The partition 420 is deformed such that the first blocking section 4221 closes the first air passage 610, and the second blocking section 4222 closes the second air passage 620. The partition 42 obtained by thus deforming the partition 420 (spatially) separates the depressurized space 50 from the vent space 520. The partition (second section) 42 and a section (first section) 41 of the frame member 410 corresponding to the depressurized space 50 form the seal 40 surrounding the depressurized space 50.

Thus, the depressurized space 50 is created by evacuating the evacuation space 510 through the vent space 520 and the exhaust port 700.

The first section 41 is a section of the frame member 410 corresponding to the depressurized space 50. The second section 42 is I-shaped and is a remaining one side of the four sides of the seal 40.

In the evacuation step, force is generated in a direction in which the first plate glass 200 and the second plate glass 300 approach each other. At this time, the spacers 70 secure the space between the first plate glass 200 and the second plate glass 300.

The hermetically sealing step provides the assembly 110 illustrated in FIGS. 7 to 9. The assembly 110 includes the first plate glass 200, the second plate glass 300, the seal 40, the depressurized space 50, the vent space 520, the gas adsorbent 60, and the plurality of spacers 70. In FIG. 8, a part (lower right part) of the first plate glass 200 is cut away for ease of understanding the internal structure of the glass panel unit.

The removal step is a step of removing a part 11 including the vent space 520 from the assembly 110 to obtain the glass panel unit 10 which is a part including the depressurized space 50. As illustrated in FIG. 8, specifically, the assembly 110 taken out of the melting furnace is cut along a cutting line 900 to be divided into a predetermined part (glass panel unit) 10 including the depressurized space 50 and a part (unnecessary part) 11 including the vent space 520. FIG. 10 shows how the unnecessary part 11 is removed from the assembly 110.

The cutting is performed by any cutting device. Examples of the cutting device include a scriber and a laser.

Through the above-described preparation step, assembling step, hermetically sealing step, and removal step, the glass panel unit 10 as illustrated in FIGS. 1 and 2 is obtained.

Next, a method for providing the spacer 70 with the orientation of the molecular chains 71 other than the method of elongating the macromolecular film in the orthogonal direction 92 will further be described.

As a first example is referable a method of compressing spacers 70 each having a columnar shape and containing a macromolecular material while heating to arrange the spacers 70 on the first glass panel 20 or the second glass panel 30.

In the first example, the spacers 70 containing a macromolecular material and having a columnar shape with a diameter of 599 μm were obtained by a process of maintaining at 450° C. for 15 minutes while compression force of 40 N was applied. A destructive test was performed on the spacers 70 of the first example and spacers 70 as a comparative example having a columnar shape with a diameter of 541 μm and containing a macromolecular material without having been subjected to the above-described processes. Table 1 shows the breaking load and the breaking stress of the spacers 70 of the first example and the spacers 70 of the comparative example.

TABLE 1

|  | Diameter (μm) | Breaking Load (N) | Breaking Stress (MPa) |
| --- | --- | --- | --- |
| First Example | 599 | 180 | 643 |
| Comparative Example | 541 | 136 | 586 |

Table 1 shows that the compressive strength (breaking stress) of the spacers 70 of the first example is higher than that of the spacers 70 of the comparative example.

A second example will be described. In manufacturing of a glass panel unit 10, spacers 70 are placed on a first glass panel 20 or a second glass panel 30 (in the spacer provision step), and a frame member 410 and a partition 420 are formed on the first glass panel 20 or the second glass panel 30 (in the seal member forming step). Thereafter, the first glass panel 20 and the second glass panel 30 are hermetically bound by a frame member 41, thereby forming a pre-assembled component 100 (in the assembling step), and then, an evacuation space 510 of the pre-assembled component 100 is evacuated (in the evacuation step). In the evacuation step, the first glass panel 20 and the second glass panel 30 are subjected to atmospheric pressure, and therefore, the spacers 70 are compressed in a counter direction 91 and extend in an orthogonal direction 92. At this time, the evacuation temperature is increased to or higher than a temperature at which a resin contained in the spacers 70 is plastically deformed, and thereby, the resin is plastically deformed, and a large number of molecular chains 71 are oriented in the orthogonal direction 92. Moreover, in this case, the resin is plastically deformed and the molecular chains 71 easily move, and therefore, the molecular chains 71 which are tangled are less likely to be broken.

The spacers 70 thus formed have high compressive strength, and therefore, the spacers 70 are less likely to be broken when an impact load is applied to the first glass panel 20 or the second glass panel 30.

Moreover, as a third example, a method of patterning paste containing a macromolecular material on a first glass panel 20 or a second glass panel 30 by screen printing or a wet process with a dispenser or the like and then drying and curing the paste thus patterned is referable.

Moreover, the orientation of the molecular chains 71 is not necessarily provided through a step of intentionally providing the orientation. The orientation may be provided by, for example, elongating a film by using heat shrinkage which occurs during film formation by a casting method or the like. That is, a method for providing the orientation is not particularly limited to the above-described examples as long as the ratio of the molecular chains 71 oriented in the orthogonal direction 92 is consequently higher than that of the molecular chains 71 oriented in the counter direction 91.

Note that the ratio of the molecular chains 71 oriented in the counter direction 91 to the molecular chains 71 oriented in the orthogonal direction 92 does not have to be 0:1.

Moreover, the ratio of the thermal conductivity in the orthogonal direction 92 to the thermal conductivity in the counter direction 91 is preferably higher than or equal to, for example, 1.5, more preferably higher than or equal to 2, and much more preferably higher than or equal to 5.

Figure 12:
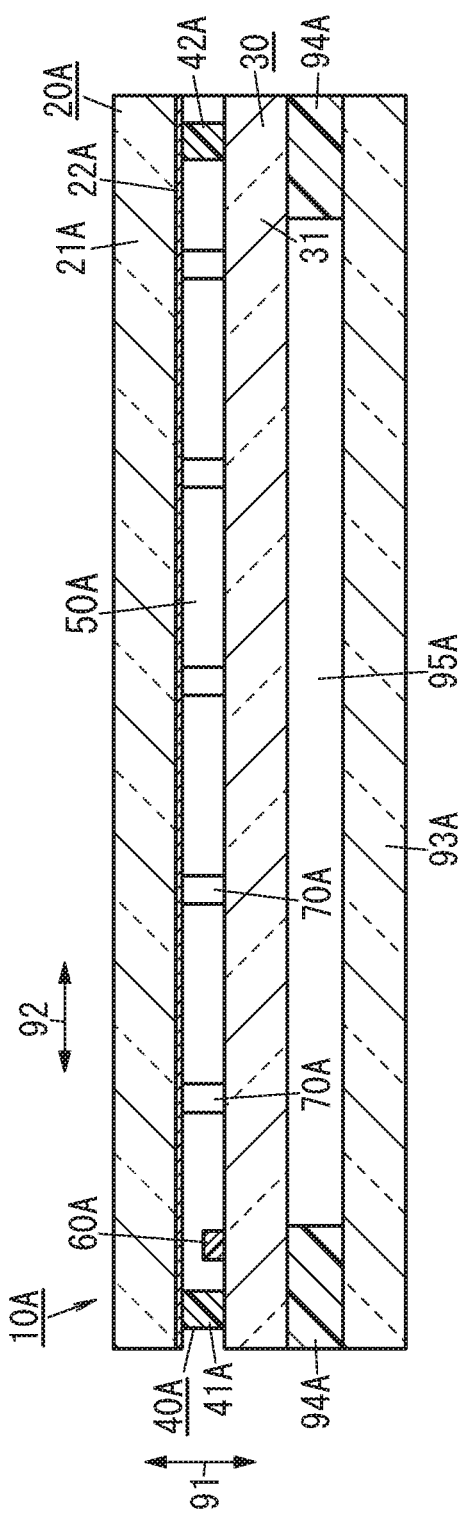
FIG. 12 is a sectional view schematically illustrating a glass panel unit according to a second embodiment of the present disclosure.
Figure 13:
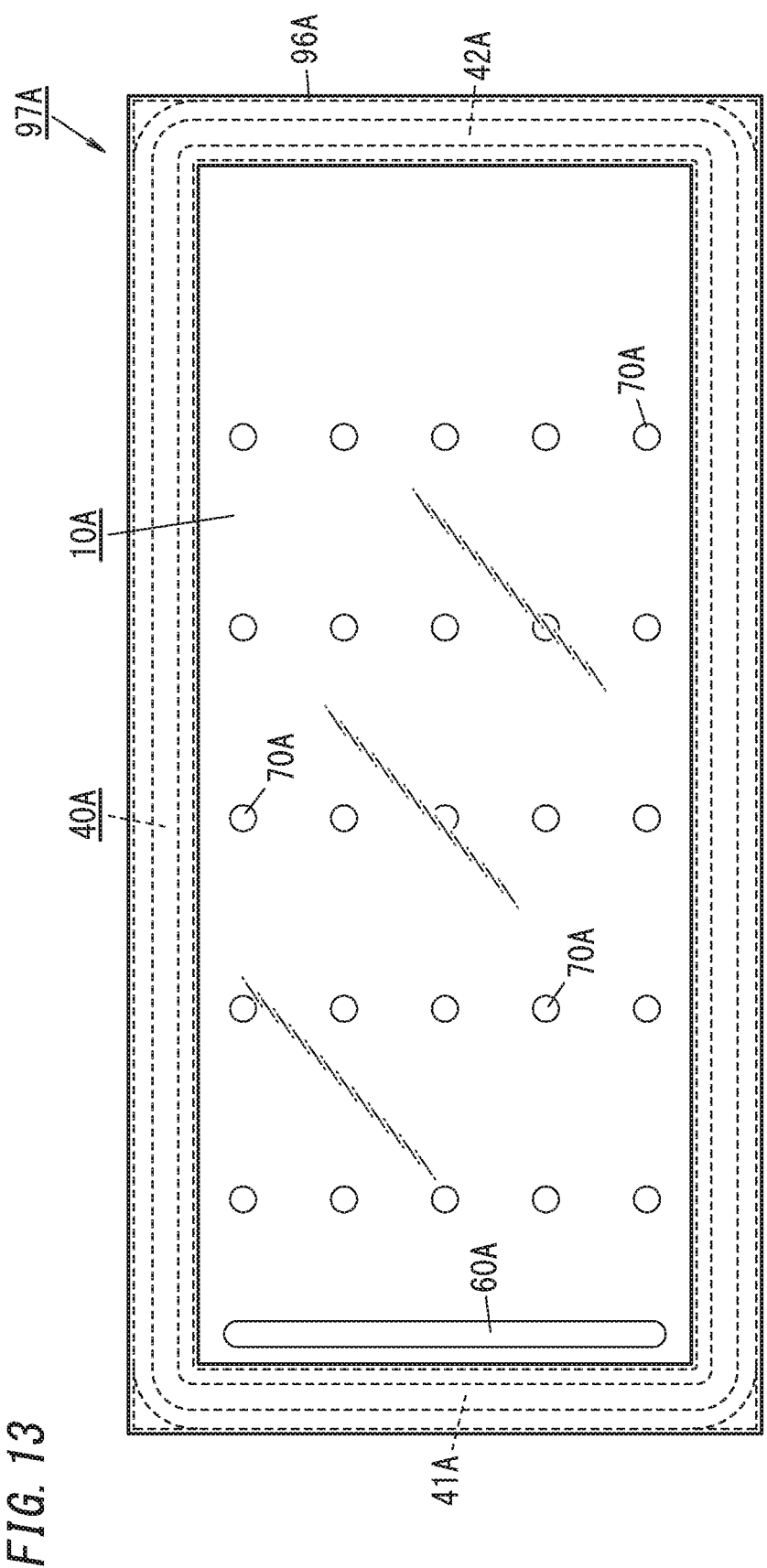
FIG. 13 is a front view illustrating an insulating glass window including the glass panel unit.

With reference to FIGS. 12 and 13, a second embodiment will be described. Note that the second embodiment includes components in addition the components of the first embodiment, and therefore, components corresponding to those in the first embodiment are denoted by the same reference signs as those in the first embodiment with "A" at the end, the description thereof is omitted, and different components are mainly described.

As illustrated in FIG. 12, a glass panel unit 10A in the second embodiment includes a third glass panel 93A disposed on a side of one of a first glass panel 20A and a second glass panel 30A which is not in contact with a depressurized space 50A. The glass panel unit 10A includes a second seal 94A which has a frame shape and hermetically binding the third glass panel 93A and the first glass panel 20A or the second glass panel 30A which faces the third glass panel 93A. The glass panel unit 10A includes a second inside space 95A surrounded by the third glass panel 93A, the first glass panel 20A or the second glass panel 30A which faces the third glass panel 93A, and the second seal 94A.

The second inside space 95A may be a depressurized space (including a vacuum space) similar to the depressurized space 50A or may be a space filled with gas.

Moreover, as illustrated in FIG. 13, the glass panel unit 10A may be fit in a window frame 96A to form an insulating glass window 97A.

The glass panel unit 10A of the second embodiment provides a further improved thermal insulation property. Moreover, the second embodiment provides the insulating glass window 97A having a further improved thermal insulation property.

Thus, as can be seen from the first embodiment and the second embodiment described above, a glass panel unit 10 of a first aspect according to the present disclosure includes: a first glass panel 20 including at least a glass pane 210; and a second glass panel 30 disposed to face the first glass panel 20. The second glass panel 30 includes at least glass pane 310. The glass panel unit 10 includes: a seal 40 having a frame shape and hermetically binding the first glass panel 20 and the second glass panel 30 together; and a depressurized space 50 surrounded by the first glass panel 20, the second glass panel 30, and the seal 40. The glass panel unit 10 includes a spacer 70 disposed between the first glass panel 20 and the second glass panel 30.

The spacer 70 contains a macromolecular resin material including molecular chains 71. Of the molecular chains 71, the number of molecular chains 71 oriented in an orthogonal direction 92 is larger than the number of molecular chains 71 oriented in a counter direction 91. The orthogonal direction 92 is orthogonal to the counter direction 91, and the counter direction 91 is a direction in which the first glass panel 20 and the second glass panel 30 face each other.

According to the first aspect, it is possible to reduce only the thermal conductivity in the counter direction 91 of the first glass panel 20 and the second glass panel 30. Thus, it is possible to realize increased strength and a low thermal conductivity of the spacer 70 (in other words, both the thermal insulation property and the impact resistance can be realized).

A second aspect according to the present disclosure is realized in combination with the first aspect. In the second aspect, the spacer 70 is formed of a macromolecular film elongated in the orthogonal direction 92. A normal direction to a surface of the macromolecular film corresponds to the counter direction 91. An elongation ratio of the spacer 70 in a first direction orthogonal to the counter direction 91 is different from an elongation ratio of the spacer 70 in a second direction orthogonal to the counter direction 91 and the first direction.

According to the second aspect, without making the elongation ratio in the first direction and the elongation ratio in the second direction equal to each other, the highest possible elongation ratio can be achieved, and it is possible to further increase the compressive strength and to further reduce the thermal conductivity in the counter direction 91.

A third aspect is realized in combination with the first aspect or the second aspect. In the third aspect, the elongation ratio of the spacer 70 in at least one of the first direction and the second direction is higher than or equal to 5.

According to the third aspect, it is possible to further increase the compressive strength of the spacer 70 and to further reduce the thermal conductivity in the counter direction 91.

A fourth aspect is realized in combination with any one of the first to third aspects. In the fourth aspect, in a step of elongating the macromolecular film serving as the spacer 70 in the orthogonal direction 92, the macromolecular film is elongated at a temperature higher than or equal to a softening point of at least the seal 40.

According to the fourth aspect, a resin included in the spacer 70 is more likely to be plastically deformed, and a large number of molecular chains 71 are more easily oriented in the orthogonal direction 92.

Moreover, the macromolecular film is elongated at a temperature higher than or equal to the softening point of the seal 40 in advance. Therefore, the spacer 70 is more likely to maintain high orientation even after the heat processing step subsequently performed on the glass panel unit.

Note that as the temperature at the time of providing the molecular chains 71 of the spacer 70 with orientation, for example, in a step of elongating the spacer 70 increases, the ratio of the molecular chains 71 oriented in the orthogonal direction 92 to the molecular chains 71 oriented in the counter direction 91 increases.

A fifth aspect is realized in combination with any one of the first to fourth aspects. In the fifth aspect, in an evacuation step of evacuating an evacuation space 510 of a pre-assembled component 100 formed by hermetically binding the first glass panel 20 and the second glass panel 30 by the frame member 41, the spacer 70 is sandwiched between the first glass panel 20 and the second glass panel 30 under influence of atmospheric pressure, and a macromolecular resin material included in the spacer 70 is plastically deformed by a heating process.

According to the fifth aspect, the spacer 70 is compressed in the counter direction 91 and extend in the orthogonal direction 92, and the resin included in the spacers 70 is plastically deformed, thereby a large number of molecular chains 71 are oriented in the orthogonal direction 92.

A sixth aspect is realized in combination with the fifth aspect. In the sixth aspect, a temperature of the heating process in the evacuation step is higher than or equal to a glass-transition temperature of the macromolecular resin material included in the spacer 70.

According to the sixth aspect, the resin included in the spacer 70 is plastically deformed significantly, and thus, much more molecular chains 71 are oriented in the orthogonal direction 92.

Moreover, the softening point of the seal 40 is preferably lower than or equal to the glass-transition temperature of the macromolecular resin material of the spacer 70. Thus, degradation of the orientation of the molecular chains 71 can be suppressed.

REFERENCE SIGNS LIST

10 Glass Panel Unit
20 First Glass Panel
30 Second Glass Panel
40 Seal
50 Depressurized Space
70 Spacer
71 Molecular Chain
73 Elongation Direction
91 Counter Direction
92 Orthogonal Direction

The invention claimed is:

1. A glass panel unit, comprising:
a first glass panel including at least a glass pane;
a second glass panel disposed to face the first glass panel, the second glass panel including at least glass pane;
a seal having a frame shape and hermetically binding the first glass panel and the second glass panel together;
a depressurized space surrounded by the first glass panel, the second glass panel, and the seal; and
a spacer disposed between the first glass panel and the second glass panel, wherein
the spacer contains a macromolecular resin material including molecular chains, and
of the molecular chains, a number of molecular chains oriented in an orthogonal direction is larger than a number of molecular chains oriented in a counter direction, the orthogonal direction being orthogonal to the counter direction, the counter direction being a direction in which the first glass panel and the second glass panel face each other.

2. The glass panel unit according to claim 1, wherein
the spacer is formed of a macromolecular film elongated in the orthogonal direction, a normal direction to a surface of the macromolecular film corresponding to the counter direction, an elongation ratio of the spacer in a first direction orthogonal to the counter direction being different from an elongation ratio of the spacer in a second direction orthogonal to the counter direction and the first direction.

3. The glass panel unit according to claim 1, wherein
an elongation ratio of the spacer in at least one of a first direction and a second direction is larger than or equal to 5.

4. The glass panel unit accordingly to claim 2, wherein
an elongation ratio of the spacer in at least one of a first direction and a second direction is larger than or equal to 5.

\* \* \* \* \*